United States Patent
Shimao et al.

(10) Patent No.: US 6,547,889 B2
(45) Date of Patent: Apr. 15, 2003

(54) IRON-BASED ALLOY SHEET FOR MAGNETIC YOKES IN HARD-DISK VOICE-COIL MOTOR

(75) Inventors: Masanobu Shimao, Fukui-ken (JP); Takehisa Minowa, Fukui-ken (JP); Masaaki Nishino, Fukui-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/945,710

(22) Filed: Sep. 5, 2001

(65) Prior Publication Data
US 2002/0102442 A1 Aug. 1, 2002

(30) Foreign Application Priority Data

Sep. 8, 2000 (JP) .......................... 2000-273196
Sep. 8, 2000 (JP) .......................... 2000-273197
Sep. 8, 2000 (JP) .......................... 2000-273198

(51) Int. Cl.$^7$ .............................................. H01F 1/147
(52) U.S. Cl. ........................................ 148/311; 148/306
(58) Field of Search ........................ 148/306, 311, 148/312; 420/8, 87, 114, 121, 122, 123, 124, 125, 126, 127, 128

(56) References Cited

U.S. PATENT DOCUMENTS

| | | | | |
|---|---|---|---|---|
| 4,994,122 A | * | 2/1991 | DeBold et al. | 148/306 |
| 5,091,024 A | * | 2/1992 | DeBold et al. | 148/306 |
| 5,501,747 A | * | 3/1996 | Masteller et al. | 148/311 |
| 6,416,594 B1 | * | 7/2002 | Yamagami et al. | 148/120 |

\* cited by examiner

*Primary Examiner*—John Sheehan
(74) *Attorney, Agent, or Firm*—Wenderoth, Lind & Ponack, L.L.P.

(57) ABSTRACT

The invention discloses an iron-based alloy sheet as a material for preparing a magnetic yoke member to build up a magnetic circuit in a hard-disk voice-coil motor as well as a magnetic yoke member made from such a sheet material. With an object to improve the magnetic circuit in respect of compactness and flatness, the iron-based alloy forming the sheet material contains inherent side elements including C, Si, Mn, P, S, Al, O and N each in a specified amount and is characterized by specified values of saturated magnetic flux density, maximum magnetic permeability and coercive force. The iron-based alloy may further contain up to 10% by weight of cobalt and/or one or a combination of adjuvant elements selected from Ti, Zr, Nb, Mo, Cr, V, Ni, W, Ta and B.

5 Claims, 1 Drawing Sheet

IRON-BASED ALLOY SHEET FOR MAGNETIC YOKES IN HARD-DISK VOICE-COIL MOTOR

BACKGROUND OF THE INVENTION

The present invention relates to an iron-based alloy sheet which is useful as a material of magnetic yokes in a compact-size flat-type hard-disk voice-coil motor (VCM) as well as to a magnetic yoke manufactured from such an iron-based alloy sheet capable of exhibiting a high magnetic flux density as a component of the magnetic circuit.

Voice-coil motors are widely employed as an actuator for driving a hard-disk head in which, as is known, the magnetic circuit of the voice-coil motor is constituted of permanent magnets and magnetic yokes connecting the permanent magnets. Along with the trend in recent years that computers are required to be more and more compact in size and lighter and lighter in weight in consideration of good port-ability and convenience in other respects, the magnetic recording instruments are designed also to be compact and flat. This trend toward compactness and flatness of instruments is now extending influences thereof to the permanent magnets and yokes constituting the magnetic circuit of voice-coil motors.

A conventional way to accomplish further compactness and flatness of a magnetic circuit is to use a high-performance permanent magnet capable of giving an increased magnetic flux density by which the decrease in the magnetic flux density in the air gap space due to volume decrease can be compensated.

While high-performance permanent magnets are on the way of further improvements year by year to generate a further increased magnetic flux density, the magnetic yokes in voice-coil motors are manufactured conventionally from a magnetically soft rolled steel sheet of the grade such as SPCC, SPCD, SPCE and others so that, insofar as the magnetic yokes manufactured from these conventional steel sheets are used, improvements can hardly be expected in the saturated magnetization of the magnetic yokes in compliance with upgrading of the magnetic flux density of the permanent magnets. Since the thickness of the magnetic yokes is also under limitation by the compactness or flatness of the instrument as a whole, a large magnetic flux of a high-performance permanent magnet cannot be fully utilized in the magnetic circuit with local saturation of the yokes or partial leakage of the magnetic flux out of the magnetic circuit.

The disadvantage caused by the magnetic flux leakage mentioned above is not limited to the undesirable decrease of the magnetic flux density in the air gap within the magnetic circuit but also includes adverse influences and disturbances on the magnetic recording media and other peripheral instruments for control of the system. Accordingly, current product standards specify that the amount of magnetic flux leakage must be kept low not to exceed the specified upper limit.

The magnetic material of magnetic yokes in magnetic recording instruments and other instruments most widely used in recent years includes cold-rolled steel sheets of the grade such as SPCC, SPCD, SPCE and others by virtue of their excellent workability in punching, templating, drilling, bending and embossing as well as of their inexpensiveness. Since the saturation magnetization of these steel sheet materials is not very large, however, it is difficult, in a VCM magnetic circuit in compliance with the above mentioned trend toward compactness and flatness, to completely avoid local saturation of magnetization and to fully conduct the magnetic flux coming from high-performance permanent magnets generating a high magnetic flux density through the magnetic circuit.

SUMMARY OF THE INVENTION

In view of the above described problems and disadvantages in the prior art magnetic yokes in hard-disk voice-coil motors, the present invention has an object to provide an iron-based alloy sheet suitable as a material for the manufacture of magnetic yokes in a voice-coil motor by which any high magnetic flux density provided by a high-performance permanent magnet can be fully utilized in the magnetic circuit without leakage of the magnetic flux out of the magnetic circuit.

Thus, the iron-based alloy sheet provided by the present invention is a sheet material having a thickness in the range from 0.1 mm to 5.0 mm and is made from an iron-based alloy which comprises inherent side elements including:
from 0.0001 to 0.02% by weight of carbon;
from 0.0001 to 0.05% by weight of silicon;
from 0.001 to 0.2% by weight of manganese;
from 0.0001 to 0.05% by weight of phosphorus;
from 0.0001 to 0.05% by weight of sulfur;
from 0.0001 to 0.1% by weight of aluminum;
from 0.001 to 0.1% by weight of oxygen; and
from 0.0001 to 0.03% by weight of nitrogen,
the balance to 100% by weight being iron and unavoidable impurity elements, and which is characterized by the magnetic parameters including:
a saturated magnetic flux density in the range from 2.07 to 2.2 Tesla;
a maximum magnetic permeability in the range from 1000 to 20000; and
a coercive force in the range from 10 to 400 A/m.

Further improvements in the magnetic properties can be accomplished when the above defined alloy composition is additionally admixed with 0.1 to 10% by weight of cobalt to give:
a saturated magnetic flux density in the range from 2.07 to 2.3 Tesla;
a maximum magnetic permeability in the range from 1000 to 20000; and
a coercive force in the range from 10 to 400 A/m.

When further upgrading of the performance of the iron-based alloy sheet for magnetic yokes is desired, the iron-based alloy can further comprise from 0.1 to 10% by weight of cobalt as an adjuvant element or from 0.01 to 5% by weight as a total of an adjuvant element or elements selected from the group consisting of titanium, zirconium, niobium, molybdenum, chromium, vanadium, nickel, tungsten, tantalum and boron in combination with up to 10% by weight of cobalt or without cobalt so that the magnetic parameters characterizing the iron-based alloy include:
a saturated magnetic flux density in the range from 2.07 to 2.3 Tesla;
a maximum magnetic permeability in the range from 1200 to 22000; and
a coercive force in the range from 20 to 380 A/m.

DETAILED DESCRIPTION OF THE PREFERRED EMBODIMENTS

Figure 1:
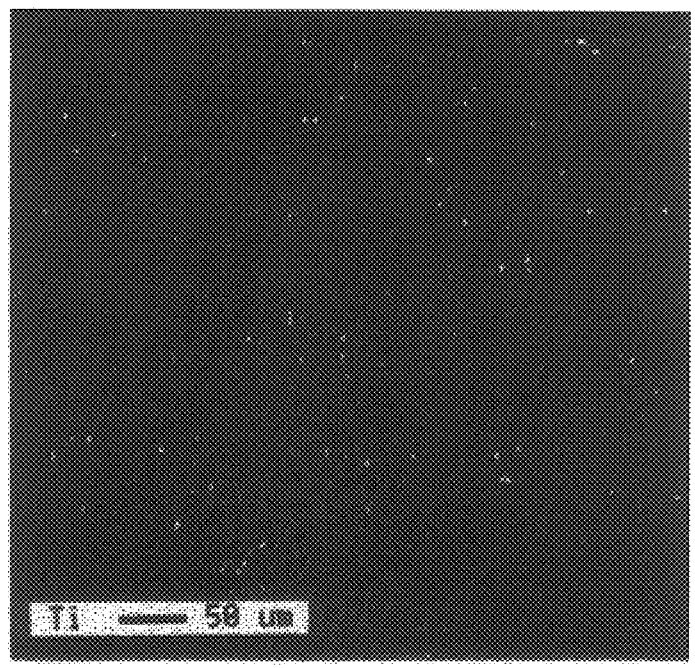
FIGS. 1 and 2 are each a photograph by the electron micro-probe analyzer taken with the Ti—K $\alpha$ 1 line and C—K $\alpha$ line, respectively, on the iron-based alloy sheet prepared in Example 18.

With an object to accomplish the above mentioned object of the present invention, the inventors have continued extensive investigations on the relationship between various nonferrous elements inherently contained as side elements in ordinary iron-based materials or intentionally added thereto as adjuvant elements and the magnetic properties required for an iron-based alloy sheet as a material for the manufacture of magnetic yokes in a hard-disk voice-coil motor. As a result, the inventors have arrived at an unexpected discovery that, due to absence of a magnetic moment or non-equivalent magnetic moment to that of the iron matrix, carbon, aluminum, silicon, phosphorus, sulfur and manganese each have an adverse influence of decreasing the magnetic moment of the iron therearound. In particular, phosphorus and sulfur adversely affect the corrosion resistance of the iron-based alloy in addition to the decreasing effect on the magnetic flux density. It is, however, practically not feasible to attempt complete removal of these elements, for example, to be lower than the respective detection limits at great costs because these elements each have no particular adverse influences on the magnetic properties unless the content thereof exceeds a certain upper limit.

In this regard, the iron-based alloy for the inventive sheet material should preferably contain the inherent side elements including:
from 0.0001 to 0.02% by weight of carbon;
from 0.0001 to 0.05% by weight of silicon;
from 0.001 to 0.2% by weight of manganese;
from 0.0001 to 0.05% by weight of phosphorus;
from 0.0001 to 0.05% by weight of sulfur; and
from 0.0001 to 0.1% by weight of aluminum.

Oxygen and nitrogen, which are among the inherent side elements, also have some influences on the magnetic properties of the iron-based alloy but the influences on the magnetic flux density of the alloy are not particularly adverse if the contents of oxygen and nitrogen are in the ranges of 0.001 to 0.1% by weight and 0.0001 to 0.03% by weight, respectively.

If the content of each of these inherent side elements is within the above mentioned range, namely, the iron-based alloy sheet has magnetic properties suitable as a material of magnetic yokes including the magnetic parameters of:
a saturated magnetic flux density in the range from 2.07 to 2.2 Tesla;
a maximum magnetic permeability in the range from 1000 to 20000; and
a coercive force in the range from 10 to 400 A/m.

As to the adjuvant element or elements which should be intentionally added to the above described iron-based alloy with an object of further upgrading of the magnetic properties, cobalt is one of the important adjuvant elements and should be contained in the iron-based alloy in an amount in the range from 0.1 to 10% by weight so that the saturated magnetic flux density can be 2.07 to 2.3 Tesla. Namely, the atom of cobalt has outer shell electrons in a larger number than in the atom of iron so that addition of cobalt to the iron-based alloy is expected to have an effect of increasing the saturation magnetization and magnetic flux density of the alloy enabling to fully conduct the magnetic flux generated in the high-performance permanent magnets to the magnetic circuit. The content of cobalt, however, is limited not to exceed 10% by weight because an excessively high content of cobalt results in an unnecessarily high mechanical strength and hardness to cause difficulties in the rolling works of the alloy into sheets if not to mention the economical disadvantage due to expensiveness of cobalt.

Besides cobalt, the adjuvant elements can be selected from the group consisting of titanium, zirconium, niobium, molybdenum, chromium, vanadium, nickel, tungsten, tantalum and boron, referred to as the non-cobalt adjuvant elements hereinafter, either singly or as a combination of two kinds or more. It is preferable that these non-cobalt adjuvant elements are contained in the alloy in the form of a carbide or oxide as precipitated and finely dispersed around the grain boundaries or within the grains of the alloy matrix.

Although these non-cobalt adjuvant elements cause a decrease in the magnetic flux density of the iron-based alloy when a solid solution thereof is formed within the ferrite phase, an intermetallic compound thereof is formed with carbon and/or oxygen as unavoidable inherent side elements giving a carbide or oxide. As a result, the precipitates thereof are finely and evenly precipitated in the alloy texture so as to inhibit migration of dislocations during the plastic deformation works. Accordingly, the ductility of the alloy can be adequately controlled thereby so that occurrence of fins on the shear-cut surfaces formed by punching of a sheet material is decreased.

As is known with certain grades of stainless steels, molybdenum, chromium, vanadium and nickel as adjuvant elements have an effect of increasing the corrosion resistance of iron-based alloy sheets. On the other hand, tungsten, tantalum and boron have an effect of improving the rolling workability of the iron-based alloy materials so as to contribute to a decrease in the production cost of the alloy sheets.

The content of these non-cobalt adjuvant elements in the iron-based alloy is in the range from 0.01 to 5% by weight for a single adjuvant element or as a total of a plurality of the non-cobalt adjuvant element admixed in combination. An excessive increase in the content of these non-cobalt adjuvant elements rather has an effect of decreasing the magnetic flux density of the iron-based alloy. It is of course optional that these non-cobalt adjuvant elements are admixed in combination with cobalt as the primary adjuvant element. When cobalt is used in combination with the non-cobalt adjuvant elements, the content of cobalt is also limited not to exceed 10% by weight in the iron-based alloy.

When the content of the alloying elements including cobalt and the non-cobalt adjuvant elements is adequately controlled, the iron-based alloy is characterized by the magnetic parameters including:
a saturated magnetic flux density in the range from 2.07 to 2.3 Tesla;
a maximum magnetic permeability in the range from 1200 to 22000; and
a coercive force in the range from 20 to 380 A/m.

The alloying work of the iron-based alloy with the adjuvant elements each in the above specified content can be performed according to a known steel-making process which should preferably be a continuous casting process in order to accomplish high productivity and excellent product quality and a vacuum melting process for production in a small lot size. The slab obtained by casting is subjected to thickness reduction by hot rolling or cold rolling into a sheet of a desired thickness which is then subjected to plastic deformation works into the form of a desired yoke by a mechanical means such as punching, templating, drilling, trimming, bending and embossing and then to removal of fins, chamfering and acid pickling followed by a surface treatment such as electrolytic or electroless plating with a metal such as nickel, copper, chromium and aluminum, PVD, CVD or ion plating to finish a yoke for use in a hard disk voice-coil motor.

The hot-rolling process is performed in the following manner. Thus, a blooming obtained by casting is heated in a continuous or batch-wise electric furnace and subjected to scale removal by using a scale breaker followed by roughing-down and finishing-down in a rolling machine described below and then correction by using a leveler with 5 to 12 rollers into a steel belt of a desired thickness which is cut into specified lengths or wound into a coil. In the cold-rolling process in which the above mentioned step of heating is omitted, scale removal is followed by roughing-down, finishing-down and correction rolling. If necessary, the step of correction should be preceded by the steps of electric cleaning and annealing interposed between the rolling steps. Known rolling machines include those of the double pullover type, double reversal type, triple roller type and quadruplex roller type. The rollers in the rolling machine are required to have high mechanical strengths to withstand heavy loads along with low surface friction so that core-excepting high-alloy grain rollers are preferably used. In conducting conditioning rolling, dull rollers, glazing rollers and unitemper rollers are used depending on the desired surface finishing.

In the process of hot rolling in general, the heating temperature of the billets is from 1230 to 1290° C., the temperature at the end of roughing-down is from 1050 to 1150° C., the temperature of finishing-down is from 810 to 930° C. and the temperature in coiling is 720° C. or below. Of these process temperatures, the texture and properties of the rolled sheet are influenced most strongly by the temperatures in the steps of finishing-down and coiling. When the steel material under rolling contains relatively small amounts of adjuvant elements and impurities, it is preferable that the roughing-down rolling is concluded at 950° C. or higher and the finishing-down rolling is conducted at 850° C. or below because such steel materials are liable to cause hot-shortness.

The thus obtained yoke should have a thickness in the range from 0.1 mm to 5 mm. When the thickness is too small, improvements in the magnetic characteristics of the magnetic circuit can hardly be expected even thought the alloy sheet is imparted with substantially improved magnetic properties. On the other hand, no particular advantages can be obtained by increasing the thickness to exceed the above mentioned upper limit because a yoke material of any conventional steel material would be free from the problem of saturation of the magnetic circuit provided that the yoke material has such a large thickness.

In the following, the iron-based alloy sheet of the present invention for use as a material of yokes in a hard-disk voice-coil motor is described in more detail by way of Examples and Comparative Examples, which, however, never limit the scope of the present invention in any way. In the following description, the percentage "%" giving the alloying proportion of a particular alloying element always refers to "% by weight". The names of the alloying elements are always given for brevity by the chemical symbols of the respective elements.

EXAMPLE 1

A steel alloy containing 0.005% of C, 0.006% of Si, 0.052% of Mn, 0.004% of S, 0.007% of Al, 0.03% of O and 0.004% of N, the balance being Fe and unidentified trace impurity elements, was melted and subjected to continuous casting to give a 200 mm by 500 mm wide slab having a thickness of 50 mm. The steel slab was heated at 1200° C. to initiate hot rolling which was conducted at 950° C. or below in a cumulative draft ratio of 60% and terminated at 850° C. followed by air cooling down to room temperature. The steel slab after the hot rolling was subjected to cold rolling followed by finish annealing at 900° C. and pickling to give a steel sheet of 1 mm thickness.

The steel sheet was then worked in a mechanical punching press into the forms of an upper yoke and a lower yoke of a voice-coil motor which were subjected to electroless NiP plating in a plating thickness of about 8 $\mu$m. The upper and lower yokes were assembled into the form of a magnetic circuit with permanent magnets having a maximum energy product of 380 kJ/m$^3$ adhesively bonded to the inside surface of the yokes at the respective center positions to complete the magnetic circuit.

An about 4 mm by 4 mm square piece was taken by cutting from the alloy sheet for the yokes and subjected to the measurement of the saturation magnetic flux density in a vibration-sample magnetometer having a maximum magnetic field of 1.9 MA/m to give the result shown in Table 4.

Separately, the punching debris of the steel sheet after preparation of the yokes was mechanically worked into ring members each having an outer diameter of 45 mm and an inner diameter of 33 mm. According to the method specified in JIS C 2531 (1999), two of the above prepared ring members were laid one on the other with intervention of a paper sheet sandwiched therebetween and fixed together by winding with an insulating adhesive tape to serve as a core of a magnetization coil or detector coil each with 50 turns winding of a 0.26 mm diameter copper wire. Magnetic measurement with these coils was conducted on an automatic recorder for DC magnetization characteristics having a maximum magnetic field of ±1.6 kA/m to record the hysteresis curve from which the maximum magnetic permeability and coercive force were determined to give the results shown in Table 4.

With an object to evaluate the performance of the above constructed magnetic circuit, the overall magnetic flux within the air gap of the magnetic circuit was determined on a flux meter (Model 480 Flux-meter, manufactured by Lakeshore Co.) by using a flat coil currently used in actual magnetic recording instruments. The result is also shown in Table 4.

EXAMPLES 2 AND 3 AND COMPARATIVE EXAMPLES 1 TO 3

The experimental procedure in each of Examples 2 to 3 was substantially the same as in Example 1 described above except that the contents of the inherent side elements C, Si, Mn, P, S, Al, O and N in each of the iron-based alloys were as shown in Table 1, the balance being iron and unidentified trace impurities. In Comparative Examples 1 to 3, the iron-based alloy sheet in Example 1 was replaced with one of three commercial products of the SPCC grade steel sheets of 1 mm thickness obtained from different sources, the experimental procedure being substantially the same as in Example 1. Table 1 also shows the contents of the inherent side elements in these SPCC steel sheets. As is understood from Table 1, these SPCC sheets contained carbon and manganese in a content exceeding the respective upper limit in the present invention. The results of the evaluation tests of the magnetic performance are summarized in Table 4.

EXAMPLES 4 TO 8

The experimental procedure in each of Examples 4, 5 and 6 was substantially the same as in Example 1 except that the starting steel slab contained 1, 2 or 3% by weight of cobalt, respectively, as an adjuvant element in addition to the inherent side elements.

In each of Examples 7 and 8, a 200 mm thick steel slab containing 5 or 10% by weight, respectively, of cobalt was prepared by melting the alloy in an electric furnace, degassing in a converter and continuous casting. The steel slab was heat-soaked at 1100 to 1200° C. followed by hot rolling at a finishing temperature of 850 to 950° C. to have a thickness of 10 mm. A recrystallization annealing treatment at 850 to 900° C. was followed by pickling and cold rolling into a sheet of about 4 mm thickness which was subjected to annealing at about 850° C. and pickling to give a steel sheet for evaluation tests from which the upper and lower yoke forms were obtained by punching in a punching press and were provided with an about 6 μm thick plating layer of NiP by an electroless plating method. The procedure for the evaluation of these yokes was substantially the same as in Example 1.

Table 2 below shows the contents of the inherent side elements and cobalt in each of the steel sheets prepared and used in Examples 4 to 8. The results of the evaluation tests are shown in Table 4 in which the hardness of the steel sheets in Examples 4 to 8 as well as in Example 3 and Comparative Examples 2 and 3 was determined by using a Rockwell hardness tester (Model RMT-3, manufactured by Matsuzawa Co.).

EXAMPLES 9 TO 22

The experimental procedure in each of Examples 9 to 16 was substantially the same as in Example 1 except that the starting steel slabs contained, in addition of the inherent side elements in amounts indicated in Table 3A, one or a combination of the adjuvant elements including cobalt in amounts indicated in Table 3B. The experimental procedure in each of Examples 17 to 22 was substantially the same as in Example 7 except that the starting steel slabs contained, in addition to the inherent side elements in amounts indicated in Table 3A and cobalt in an amount indicated in Table 3B, one or a combination of the adjuvant elements in amounts indicated also in Table 3B. The results of the evaluation tests in Examples 9 to 22 are shown in Table 4.

Figure 2:
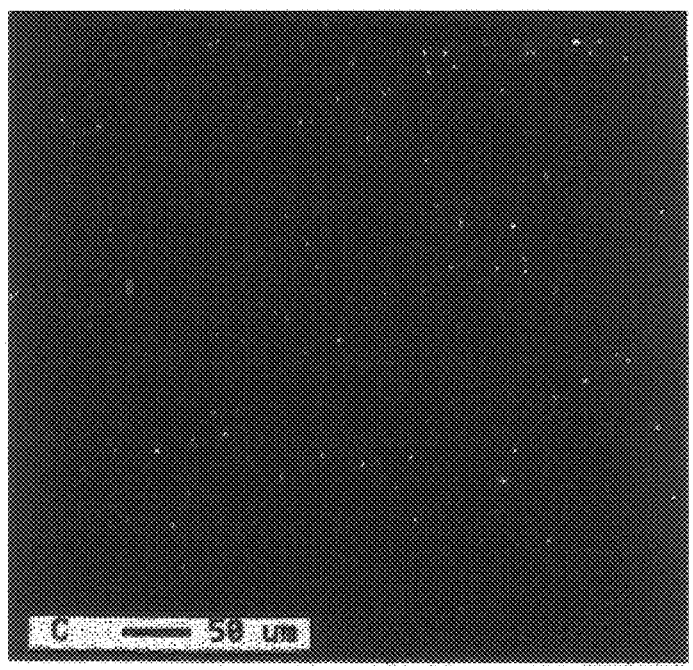

FIGS. 1 and 2 annexed hereto are each a photographic image showing distribution of titanium (FIG. 1) and carbon (FIG. 2) in the steel sheet in Example 18 obtained by the electron beam micro-probe analysis taken with the Ti-K α 1 line and C-K α line, respectively.

TABLE 1

| Example | C, % | Si, % | Mn, % | P, % | S, % | Al, % | O, % | N, % |
|---|---|---|---|---|---|---|---|---|
| 1 | 0.005 | 0.006 | 0.052 | 0.004 | 0.003 | 0.007 | 0.03 | 0.004 |
| 2 | 0.005 | 0.004 | 0.061 | 0.002 | 0.002 | 0.005 | 0.01 | 0.002 |
| 3 | 0.005 | 0.006 | 0.052 | 0.001 | 0.003 | 0.007 | 0.03 | 0.004 |

TABLE 1-continued

| | C, % | Si, % | Mn, % | P, % | S, % | Al, % | O, % | N, % |
|---|---|---|---|---|---|---|---|---|
| Comparative Example | | | | | | | | |
| 1 | 0.100 | 0.030 | 0.540 | 0.015 | 0.008 | 0.030 | 0.04 | 0.005 |
| 2 | 0.080 | 0.030 | 0.580 | 0.012 | 0.004 | 0.060 | 0.04 | 0.005 |
| 3 | 0.070 | 0.025 | 0.500 | 0.011 | 0.004 | 0.060 | 0.04 | 0.006 |

TABLE 2

| Example | C, % | Si, % | Mn, % | P, % | S, % | Al, % | O, % | N, % | Co, % |
|---|---|---|---|---|---|---|---|---|---|
| 4 | 0.005 | 0.006 | 0.052 | 0.004 | 0.003 | 0.010 | 0.03 | 0.003 | 1 |
| 5 | 0.006 | 0.004 | 0.061 | 0.003 | 0.005 | 0.010 | 0.02 | 0.003 | 2 |
| 6 | 0.005 | 0.006 | 0.040 | 0.004 | 0.003 | 0.008 | 0.02 | 0.004 | 3 |
| 7 | 0.006 | 0.004 | 0.054 | 0.002 | 0.003 | 0.005 | 0.01 | 0.002 | 5 |
| 8 | 0.005 | 0.006 | 0.060 | 0.003 | 0.002 | 0.005 | 0.02 | 0.003 | 10 |

TABLE 3A

| Example | C, % | Si, % | Mn, % | P, % | S, % | Al, % | O, % | N, % |
|---|---|---|---|---|---|---|---|---|
| 9 | 0.006 | 0.004 | 0.045 | 0.003 | 0.003 | 0.006 | 0.02 | 0.003 |
| 10 | 0.005 | 0.006 | 0.052 | 0.004 | 0.003 | 0.010 | 0.03 | 0.004 |
| 11 | 0.005 | 0.006 | 0.040 | 0.004 | 0.003 | 0.006 | 0.03 | 0.004 |
| 12 | 0.005 | 0.006 | 0.062 | 0.004 | 0.003 | 0.005 | 0.03 | 0.004 |
| 13 | 0.005 | 0.006 | 0.045 | 0.004 | 0.003 | 0.008 | 0.03 | 0.004 |
| 14 | 0.005 | 0.006 | 0.038 | 0.004 | 0.003 | 0.006 | 0.03 | 0.004 |
| 15 | 0.006 | 0.005 | 0.054 | 0.003 | 0.004 | 0.005 | 0.02 | 0.002 |
| 16 | 0.006 | 0.005 | 0.054 | 0.003 | 0.004 | 0.008 | 0.03 | 0.002 |
| 17 | 0.006 | 0.004 | 0.061 | 0.002 | 0.004 | 0.008 | 0.02 | 0.001 |
| 18 | 0.006 | 0.005 | 0.054 | 0.002 | 0.003 | 0.008 | 0.01 | 0.002 |
| 19 | 0.006 | 0.004 | 0.061 | 0.002 | 0.004 | 0.010 | 0.02 | 0.002 |
| 20 | 0.006 | 0.005 | 0.054 | 0.002 | 0.003 | 0.005 | 0.01 | 0.002 |
| 21 | 0.005 | 0.006 | 0.045 | 0.003 | 0.002 | 0.010 | 0.01 | 0.003 |
| 22 | 0.005 | 0.006 | 0.038 | 0.003 | 0.002 | 0.006 | 0.02 | 0.001 |

TABLE 3B

| Example | Co, % | Ni, % | Cr, % | Cu, % | Ti, % | Nb, % | Zr, % | Mo, % | V, % | Ta, % | B, % |
|---|---|---|---|---|---|---|---|---|---|---|---|
| 9 | — | — | — | — | 0.1 | — | — | — | — | — | — |
| 10 | 3 | 1 | — | — | — | — | — | — | — | — | — |
| 11 | 3 | — | — | 0.2 | — | — | — | — | — | — | — |
| 12 | 5 | — | — | — | — | 0.2 | — | — | — | — | — |
| 13 | 3 | — | — | — | — | — | 0.5 | — | — | — | — |
| 14 | 10 | — | — | — | — | — | — | — | 0.5 | — | — |
| 15 | 3 | 1 | 0.5 | — | 0.1 | — | — | — | — | — | — |
| 16 | 5 | 1 | 0.5 | 0.1 | 0.1 | 0.1 | 0.1 | 0.1 | 0.1 | 0.1 | 0.05 |
| 17 | 2 | — | 0.2 | — | — | — | — | — | — | — | — |
| 18 | 5 | — | — | — | 0.2 | — | — | — | — | — | — |

TABLE 3B-continued

| Example | Co, % | Ni, % | Cr, % | Cu, % | Ti, % | Nb, % | Zr, % | Mo, % | V, % | Ta, % | B, % |
|---|---|---|---|---|---|---|---|---|---|---|---|
| 19 | 3 | — | — | — | — | — | 0.2 | — | — | — | — |
| 20 | 5 | — | — | — | — | — | — | — | 0.5 | — | — |
| 21 | 3 | — | — | — | — | — | — | — | — | — | 0.1 |
| 22 | 3 | 0.5 | — | 0.1 | — | 0.1 | 0.1 | — | 0.1 | — | — |

TABLE 4

| Example | Saturated magnetic flux density, T | Maximum magnetic permeability | Coercive force, A/m | Hardness, HRB | Magnetic flux, Wb · T |
|---|---|---|---|---|---|
| 1 | 2.084 | 7,250 | 190 | — | 237.4 |
| 2 | 2.106 | 9,580 | 163 | — | 240.2 |
| 3 | 2.068 | 6,500 | 100 | 15.7 | 234.4 |
| 4 | 2.095 | 7,250 | 198 | 25.2 | 235.4 |
| 5 | 2.106 | 8,580 | 160 | 30.3 | 238.4 |
| 6 | 2.117 | 9,800 | 220 | 38.3 | 239.5 |
| 7 | 2.144 | 10,250 | 130 | 53.9 | 241.4 |
| 8 | 2.266 | 11,380 | 103 | 62.5 | 245.2 |
| 9 | 2.075 | 6,650 | 140 | 19.2 | 235.2 |
| 10 | 2.095 | 7,250 | 198 | 40.1 | 235.5 |
| 11 | 2.117 | 9,800 | 220 | 34.5 | 239.5 |
| 12 | 2.096 | 6,380 | 103 | 51.5 | 240.2 |
| 13 | 2.127 | 9,800 | 220 | 36.4 | 238.5 |
| 14 | 2.086 | 11,380 | 103 | 48.8 | 235.2 |
| 15 | 2.094 | 8,250 | 130 | 56.2 | 240.4 |
| 16 | 2.106 | 6,380 | 103 | 54.7 | 235.2 |
| 17 | 2.106 | 8,580 | 160 | 35.4 | 238.2 |
| 18 | 2.104 | 7,250 | 130 | 49.2 | 241.4 |
| 19 | 2.085 | 8,580 | 160 | 37.3 | 238.6 |
| 20 | 2.234 | 8,250 | 130 | 48.0 | 244.4 |
| 21 | 2.102 | 9,800 | 220 | 47.3 | 239.5 |
| 22 | 2.088 | 9,230 | 120 | 55.9 | 238.3 |
| Comparative Example | | | | | |
| 1 | 2.040 | 1,800 | 420 | — | 230.4 |
| 2 | 2.050 | 1,800 | 420 | 54.1 | 231.5 |
| 3 | 2.050 | 1,800 | 420 | 54.1 | 231.4 |

What is claimed is:

1. An iron-based alloy sheet as a sheet material having a thickness in the range from 0.1 mm to 5.0 mm for use as a material of a magnetic yoke to build up a magnetic circuit in a hard-disk voice-coil motor which is formed from an iron-based alloy consisting essentially of inherent side elements as follows:

from 0.0001 to 0.02% by weight of carbon;
from 0.0001 to 0.05% by weight of silicon;
from 0.001 to 0.2% by weight of manganese;
from 0.0001 to 0.05% by weight of phosphorus;
from 0.0001 to 0.05% by weight of sulfur;
from 0.0001 to 0.1% by weight of aluminum;
from 0.001 to 0.1% by weight of oxygen; and
from 0.0001 to 0.03% by weight of nitrogen, and
from 0.1 to 10% by weight of cobalt as an adjuvant element, the balance to 100% by weight being iron and unavoidable impurity elements, and which exhibits magnetic parameters including:

a saturated magnetic flux density in the range from 2.07 to 2.3 Tesla;
a maximum magnetic permeability in the range from 1000 to 20000; and
a coercive force in the range from 10 to 400 A/m.

2. A magnetic yoke to build up a magnetic circuit in a hard-disk voice-coil motor which is made from the iron-based alloy sheet defined in claim 1.

3. An iron-based alloy sheet as a sheet material having a thickness in the range from 0.1 mm to 5.0 mm for use as a material of a magnetic yoke to build up a magnetic circuit in a hard-disk voice-coil motor which is formed from an iron-based alloy consisting essentially of cobalt in an amount not exceeding 10% by weight, inherent side elements as follows:

from 0.0001 to 0.02% by weight of carbon;
from 0.0001 to 0.05% by weight of silicon;
from 0.001 to 0.2% by weight of manganese;
from 0.0001 to 0.05% by weight of phosphorus;
from 0.0001 to 0.05% by weight of sulfur;
from 0.0001 to 0.1% by weight of aluminum;
from 0.001 to 0.1% by weight of oxygen; and
from 0.0001 to 0.03% by weight of nitrogen, and at least one adjuvant element selected from the group consisting of titanium, zirconium, niobium, molybdenum, chromium, vanadium, nickel, tungsten, tantalum and boron in a total amount of the adjuvant elements in the range from 0.01 to 5% by weight, the balance to 100% by weight being iron and unavoidable impurity elements, and which exhibits magnetic parameters including:

a saturated magnetic flux density in the range from 2.07 to 2.3 Tesla;
a maximum magnetic permeability in the range from 1200 to 22000; and
a coercive force in the range from 20 to 380 A/m.

4. The iron-based alloy sheet as claimed in claim 3 in which at least one of the adjuvant elements selected from the group consisting of titanium, zirconium, niobium, molybdenum, chromium, vanadium, nickel, tungsten and tantalum is contained in the form of fine precipitates of a carbide or oxide of the element within grains or on the grain boundaries of the matrix phase.

5. A magnetic yoke to build up a magnetic circuit in a hard-disk voice-coil motor which is made from the iron-based alloy sheet defined in claim 3.

* * * * *